United States Patent [19]
Magnasco et al.

[11] Patent Number: 5,947,810
[45] Date of Patent: Sep. 7, 1999

[54] ARRANGEMENT FOR GAINING FISH MEAT IN PULP FORM

[75] Inventors: Angel Magnasco, Bad Segeberg; Reinhard Ollik, Lübeck, both of Germany

[73] Assignee: Nordischer Maschinenbau Rud. Baader GmbH & Co KG., Lubeck, Germany

[21] Appl. No.: 08/874,304

[22] Filed: Jun. 13, 1997

[30] Foreign Application Priority Data

Jun. 14, 1996 [DE] Germany ............ 196 23 699

[51] Int. Cl.$^6$ .................................... A22C 17/06
[52] U.S. Cl. ............................ 452/138; 452/182
[58] Field of Search .................. 452/138, 161, 452/182, 179

[56] References Cited

U.S. PATENT DOCUMENTS

| | | | |
|---|---|---|---|
| 2,714,221 | 8/1955 | Gradoff et al. | 452/161 |
| 3,943,603 | 3/1976 | Hartmann | 452/179 |
| 4,084,294 | 4/1978 | Dohrendorf | 452/182 |
| 4,551,885 | 11/1985 | Molnar | 452/182 |
| 5,330,383 | 7/1994 | Ryan | 452/182 |

FOREIGN PATENT DOCUMENTS

| | | |
|---|---|---|
| 27 08 203 | 2/1977 | Germany . |
| 3-23128 | 3/1991 | Japan . |

*Primary Examiner*—Willis Little
*Attorney, Agent, or Firm*—Fay, Sharpe, Beall, Fagan, Minnich & McKee

[57] ABSTRACT

An apparatus for gaining fish meat in pulp form is described. The apparatus comprises a fish filleting machine, a separating device arranged downstream of said filleting machine and comprising a perforated drum and a pressing belt wrapped around a portion of the drum, and a transport apparatus. In order to ensure that the fish enter the straining apparatus in the correct orientation and substantially flat so that the straining apparatus may operate efficiently even when double fillets are produced by the filleting machine, the transport apparatus comprises upper and lower conveying belts which positively engage the fish fillets between them and convey the fillets fixed in the correct orientation.

8 Claims, 1 Drawing Sheet

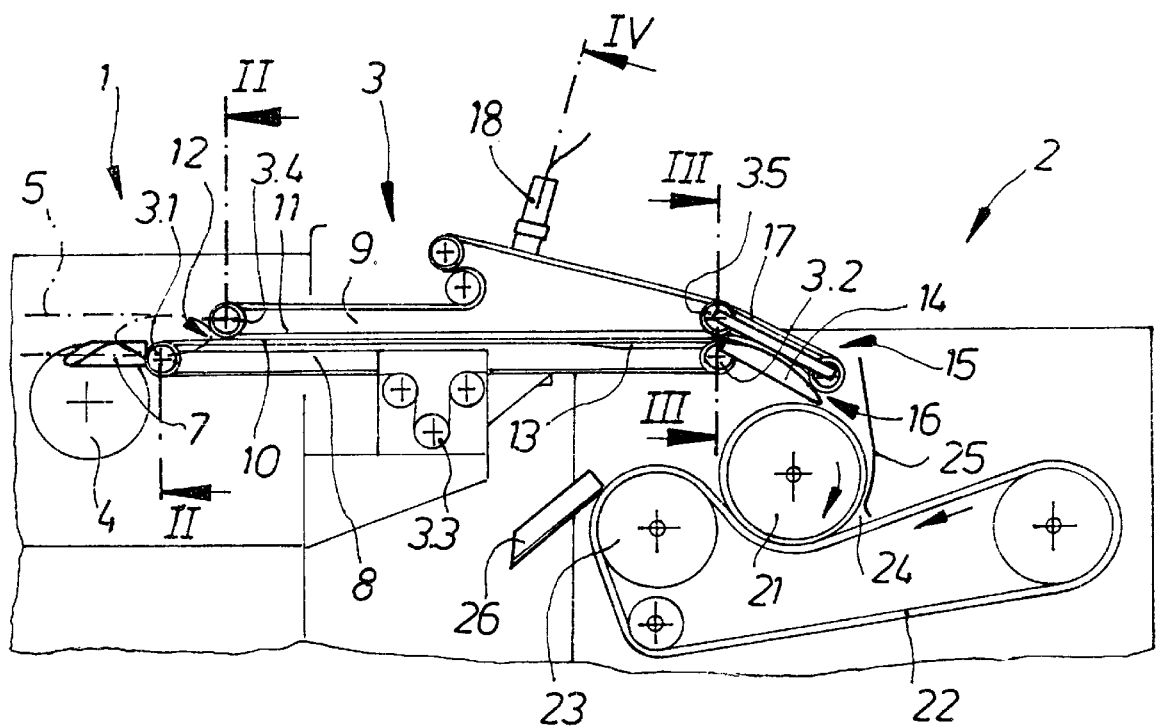
Fig. 1
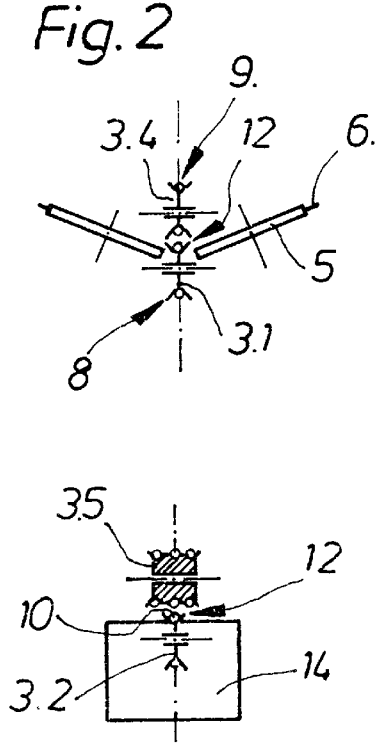
Fig. 2
Fig. 3
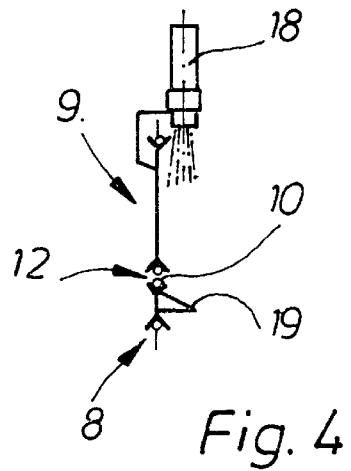
Fig. 4

ARRANGEMENT FOR GAINING FISH MEAT IN PULP FORM

BACKGROUND OF THE INVENTION

1. Field of the Invention

The invention concerns an arrangement for gaining fish meat in pulp form, the arrangement comprising a fish filleting machine, a straining machine or separating device arranged downstream of said filleting machine in operative association therewith and including a perforated drum and a pressing belt partially wrapped around the drum to press against the surface of the drum and form a pull-in zone with said drum, and a transfer apparatus disposed between said filleting machine and said separating device.

2. Prior Art

A device of this kind is known from DE Patent Publication 27 08 203. In this document a fish filleting machine is disclosed in which a separating device and a transfer surface are directly connected to each other. This surface extends to the periphery of the perforated drum and is provided for transferring the fillets from one machine to the other. In this device, the pressing belt is arranged such that the pull-in zone of the separating device is located in the region of the highest point of the perforated drum.

A disadvantage of this device is that while the fillets are crossing the transfer surface a pushing force is applied on them from behind. Because of the soft consistency of the fillets and their tendency to adhere to the surface, this will lead to the fillets becoming compressed and bunched and in extreme cases folded over onto one another so that some of the fillets will land in the pull-in zone of the separating device with the skin-side towards the perforated surface. As a result of this problem the yield will be reduced and the fish pulp may also contain particles of skin which severely impair its quality. Attempts have been made to overcome this problem by operating the separating device at a considerably higher working speed than the filleting machine. However, apart from the fact that present-day filleting machines operate at a speed which is close to the maximum reliable operating speed of straining machines, no improvement in the performance resulted.

A further disadvantage of the known device is that the separating device cannot be operated separately from the filleting machine because of the disposition of the pull-in zone which would necessitate a feed process which relies on gravity.

A combination of a filleting machine and separating device is further more known from JP 3-23138 B2. This device is provided with a transfer conveyor arranged between the output of the filleting machine and the input of the separating device. However, this conveyor is solely intended to serve an inspection and correction area, for instance to allow the position of the fillets to be corrected manually. Furthermore, the fillets are actually fed to the separating device by means of a transfer surface, which results in the disadvantages already described.

3. Objects of the Invention

It is accordingly an object of the present invention to provide an apparatus which is capable of producing fish meat pulp of a high and reliable quality from unfilleted fish.

It is a further important object of the present invention to provide a transfer apparatus suitable for automatically transferring fish fillets from a fish filleting machine to a straining apparatus which reliably ensures the correct positioning of the fillets entering the straining apparatus.

SUMMARY OF THE INVENTION

In an apparatus for gaining fish meat in a pulp form of the type described above, namely one comprising a fish filleting machine for producing fish fillets, a separating device connected downstream of said filleting machine in operative association therewith and having a perforated drum as well as a pressing belt partially wrapped around said drum to press against the surface thereof and form a pull-in zone therewith, and a transfer apparatus disposed between said filleting machine and said separating device, these and further objects are achieved when the transfer apparatus comprises a lower belt conveyor, extending into said filleting machine at an input end of said lower belt conveyor and above said perforated drum at a corresponding discharge end, and an upper belt conveyor opposing said lower belt conveyor, said upper and lower belt conveyors being spaced by a gap and being adapted to elastically engaging said fish fillets from above and below and transfer said fillets to said separating device.

The advantages associated with this arrangement are that both sides of the fish fillets are positively engaged as the fillets leave the filleting machine. The advancing force is thus applied along the whole length of the fillet so that it is impossible for the fillet to become bunched or folded. The correct and optimal position of the fillets is thus fixed and maintained throughout their transport to the straining apparatus.

In a preferred embodiment of the invention a particularly reliable operation and simple construction may be achieved when at least the lower conveyor comprises a narrow belt which starts directly in the output area of a fish conveying device of the filleting machine. Such an arrangement is also particularly suitable for transferring double fillets from the filleting machine to the separating device.

In a further advantageous embodiment of the invention the downstream end of the lower belt conveyor may directly adjoin a guide surface that extends to the periphery of the perforated drum of the separating device, a further belt conveyor being disposed above the guide surface to form a flexible gap. In a preferred arrangement the design is simplified and clarified when the upper conveyor forms this further conveyor.

The belt conveyors are preferably driven to revolve with the same speed. It is further advantageous that the speed of the belt conveyors is at least equal to the operating speed of the filleting machine and not higher than the operating speed of the separating device. In this manner, the fish fillets can be transferred without their shape or position being distorted.

In a further advantageous embodiment of the invention the perforated drum of the separating device can serve as a final conveying element in the conveying system when the drum is associated with a support plate that directly adjoins the guide plate and extends progressively towards the drum surface to form a wedge-shaped chute or hopper with the periphery of the drum for guiding the fish fillets into the pull-in zone. In this manner the fish are securely guided right up to the pull-in zone first by the belt conveyors and then by the rotating drum surface. A further advantage of this arrangement is that the action of the support surface on the fillets causes them to be stretched as they are entrained by the drum surface and fed to the pull-in zone. In another particularly useful and effective embodiment of the invention a sensor can be provided for detecting the flow of fish fillets from one machine to the other and for controlling the drive of the separating device as a function of this detection.

In this way the separating device, and specifically the pressing belt are protected from dry operation, i.e. operation without fish. This prevents undue wear of the belt and consequently extends its life so considerably reducing the running costs of the apparatus as a whole.

BRIEF DESCRIPTION OF THE DRAWINGS

Further objects and advantages of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows a partially sectional longitudinal side view of the apparatus including a transfer device, the separating device and a discharge side of the filleting machine;

FIG. 2 shows a cross-sectional view of the transfer conveyor along line II—II of FIG. 1;

FIG. 3 shows a cross-sectional view of the transfer conveyor along line III—III of FIG. 1 and FIG. 4 shows a cross-sectional view of the transfer conveyor along the line IV of FIG. 1.

DETAILED DESCRIPTION OF THE DRAWINGS

As shown in FIG. 1 the apparatus according to the invention comprises a filleting machine 1, a separating device 2 located downstream of the filleting machine and a transfer device 3 linking these two machines.

The filleting machine 1, of which only the discharge end is schematically shown in FIG. 1, is equipped with conventional, not shown filleting tools. The final tool, which is illustrated in the figure, includes a pair of circular knives 4 inclined towards one another to form an inverted "V" for cutting away the fish skeleton. The filleting machine 1 generates a product consisting of two fish fillets joined across what was the back of the fish. These so-called double fillets are conveyed within the filleting machine 1 by means of a flank conveyor 5 (see also FIG. 2) that has spikes 6 for engaging the flanks of the fish. This flank conveyor 5 advances the fish across an inverted-"V"-shaped support guide and feeds them to the transfer apparatus 3.

The transfer apparatus 3 comprises a conveyor system having an endless lower conveyor belt 8 and an endless upper conveyor belt 9. The conveying elements are preferably constituted by belts with a circular cross-section that are guided around deflection rollers 3.1 to 3.5 in such a manner that the upper run 10 of the lower belt 8 opposes the lower run 11 of the upper belt 9 with a flexible and elastic gap 12 formed between them. The conveyor belts 8 and 9 are driven at a speed which corresponds to the speed of the flank conveyor 5 of the filleting machine 1 The gap 12 defines a conveying path along which the double fillets are conveyed while being clamped along their back line; the two fillets thus hang down on either side of the lower conveyor belt 8. The conveying path terminates at the deflection rollers 3.2 and 3.5 where spreaders 13 are arranged on either side of the path for lifting up the two fillets and laterally spreading the double fillets as they are advanced. An upwardly arched guide plate 14 adjoins the lower conveyor belt 8 which guide plate is opposed by a further driven conveyor belt 15 which is spaced by an elastic gap 16 from the guide plate 14. The conveyor belt 15 comprises two parallel guided endless belts 17 which are driven by means of the deflection roller 3.5 of the upper conveyor belt 9. The deflection roller 3.5 is provided with three grooves to this purpose, the endless belts 17 being guided in the outer grooves and the upper conveyor belt 9 in the middle groove.

A sensor 18 for monitoring the product flow is associated with the upper conveyor belt 9. The sensor 18 is preferably an ultra-sonic sensor disposed in such a manner that its sensor field monitors an area lying directly adjacent the conveyor path. As illustrated in FIG. 4, a guide element 19 is arranged upstream of the sensor field on the same side of the conveying path as the sensor and ensures that those parts of the fish fillets hanging from the lower conveyor belt 8 are guided through the sensor field and registered by the sensor 18.

The separating device 2 is installed in a machine housing indicated by "20", which is only outlined in FIG. 1, and comprises a driven perforated drum 21 and an elastic pressing belt 22 wrapped around, and pressed against, part of the periphery of the drum 21. The pressure of the belt against the drum is generated by the tension of the belt and/or a pressing roller 23 the relative position of which is adjustable with respect to the position of the drum 21. In the region of the point of transfer of the fillets to the perforated drum 21, the pressing belt 22 and the drum form a pull-in zone 24. In an area directly upstream of this pull-in zone, a support surface 25 is arranged to oppose the periphery of the drum 21. The drum periphery and the support surface 25 together form a progressively diminishing funnel extending from the end of the guide plate 14 to the pull-in zone 24 between the pressing belt 22 and the perforated drum 21. At the output end of the separating device a discharge slide 26 is arranged in the area of the pressing roller 23.

The operation of the apparatus will now be described with reference to the path of a double fillet produced in the filleting machine. The double fillet is produced by cutting away the skeleton of the fish from the belly side upwards thereby leaving the back of the fish intact. This cut is performed by the pair of circular knives 4 after which the fillet is advanced skin side upwards by the flank conveyor 5 onto the inverted "V" support guide 7 with the back portion of the fillet lying on the ridge of this support guide. The back portion of the double fillet is fed into the gap 12 between the upper and lower conveyor belts 8, 9 where it is engaged throughout its length so that the fillet is constantly engaged and conveyed during its transfer. The fillet is thus advanced with the two fillets parts hanging down on either side of the lower belt conveyor 8 and arrives at the spreaders 13 which spread the double fillet out and guide it onto the guide plate 14 and into the gap 16 formed between the guide plate 14 and belt conveyor 15. At the end of the guide plate 14 the double fillet lands with its flesh side downwards on the peripheral surface of the drum 21 which guides the fillet into the funnel between the drum 21 and the support surface 25, the support surface all the while pressing against the skin side of the fillet and ensuring that it remains flat and stretched. The fillet is finally fed into the pull-in zone 24 between the pressing belt 22 and the drum 21.

By applying an appropriate pressure between the pressing belt 22 and the drum 21, the fillet flesh is forced to flow through the perforations in the drum surface into the drum interior from whence it can be removed by suitable extraction means. The skin and any bones that may be present cannot flow through the perforations and remain between the pressing belt and the drum outer surface and are finally removed by the discharge slide 26.

In order to minimise the wear of the separating device 2 and optimise its efficiency the product flow is monitored by the sensor 18. This is electrically connected to the drive of the separating device 2 and causes the separating device operation to be temporarily stopped when no fillets are detected over a predetermined period and restarted when the flow of fillets recommences.

In order to permit access to the various elements of the apparatus for easy cleaning and servicing, the transfer apparatus 3 is mounted to rotate anti-clockwise about the axis of the deflection roller 3.3 so that the end portion of the filleting 1 and separating devices 2 are easily accessible.

In order to ensure that the fillets are securely engaged by the second upper belt conveyor 15 this conveyor may be disposed to pivot about the deflection roller 3.5 so that the weight of the conveyor acts on the fillets as they are advanced.

We claim:

1. An apparatus for gaining fish meat in a pulp form, said apparatus comprising:

a fish filleting machine for producing fish fillets, a separating device connected downstream of said filleting machine and having a perforated material receiving means and a pressure exerting means partially encompassing said material receiving means to press against the surface thereof and form a pull-in zone therewith, and transfer means disposed between said filleting machine and said separating device, wherein said transfer means comprises lower conveying means extending into said filleting machine at an input end and above said perforated material receiving means at a discharge end thereof, and upper conveying means disposed to oppose said lower conveying means, wherein said upper and lower conveying means are adapted to engage said fish fillets from above and below and transfer them to said separating device, and wherein a guide surface extends between said discharge end of said lower conveying means to the periphery of said perforated material receiving means, and a further conveying means is disposed to oppose said guide surface and is adapted to elastically hold said fish fillets against said guide surface.

2. An apparatus as claimed in claim 1, wherein said further conveying means is formed by said upper conveying means.

3. An apparatus as claimed in claim 1, wherein said conveying means are driven at at least essentially same speed, this speed corresponding at least to the operating speed of said filleting machine and being no higher than the speed of said separating device.

4. An apparatus as claimed in claim 1, wherein a support surface is arranged to oppose said perforated material receiving means' surface upstream of said pull-in zone for holding said fish fillets against said pmaterial receiving means' surface, said support surface and said perforated material means' surface being spaced from one another by a distance that decreases progressively along the length of said support surface into said pull-in zone.

5. An apparatus as claimed in claim 1, wherein a support surface extends between said guide surface and said pull-in zone and opposes the periphery of said perforated material receving means for holding said fish fillets against said material receving means' surface, said support surface and said perforated material receving means' surface being spaced from one another by a distance that decreases progressively from said guide surface to said pull-in zone.

6. An apparatus as claimed in claim 1, wherein a sensor is arranged adjacent at least one of said upper conveying means and said lower conveying means for monitoring the flow of fish fillets, said sensor being associated with a control of said separating device for deactivating the same separating device when no fish fillets are detected.

7. An apparatus as claimed in claim 1, wherein said perforated material receiving means is designed in the shape of a hollow drum.

8. An apparatus as claimed in claim 1, wherein at least said lower conveying means comprises a narrow belt for supporting a central portion of said fish fillets with flank portions thereof hanging down on both sides of said belt.

* * * * *